United States Patent [19]
Grover et al.

[11] 4,440,215

[45] * Apr. 3, 1984

[54] HEAT PIPE

[75] Inventors: George M. Grover, Los Alamos; James E. Runyan, Santa Fe, both of N. Mex.

[73] Assignee: Q-dot Corporation, Garland, Tex.

[*] Notice: The portion of the term of this patent subsequent to Feb. 11, 1992 has been disclaimed.

[21] Appl. No.: 274,674

[22] Filed: Jun. 17, 1981

Related U.S. Application Data

[63] Continuation of Ser. No. 547,955, Feb. 7, 1975, abandoned, which is a continuation of Ser. No. 350,799, Apr. 13, 1973, Pat. No. 3,865,184, which is a continuation of Ser. No. 113,571, Feb. 8, 1971, abandoned.

[51] Int. Cl.$^3$ ............................................. F28D 15/00
[52] U.S. Cl. ............................ 165/104.21; 165/104.26; 122/366
[58] Field of Search .................... 165/104.21, 104.26, 165/133; 122/366

[56] References Cited

U.S. PATENT DOCUMENTS

| | | | |
|---|---|---|---|
| 1,690,108 | 8/1928 | Grady | 165/104.21 |
| 1,700,840 | 2/1929 | Gay | 165/104.21 X |
| 2,237,054 | 4/1941 | Jensen | 165/104.21 X |
| 2,279,548 | 5/1942 | Bailey | 165/184 |
| 2,426,044 | 8/1947 | O'Brien | 165/133 X |
| 3,437,847 | 4/1969 | Raspet | 165/104.26 X |
| 3,528,494 | 9/1970 | Levedahl | 165/104.26 |
| 3,734,173 | 5/1973 | Moritz | 165/104.26 |
| 3,779,310 | 12/1973 | Russell | 165/104.26 X |
| 3,788,388 | 1/1974 | Barbman | 165/104.26 X |
| 3,865,184 | 7/1975 | Grover | 165/104.26 |

FOREIGN PATENT DOCUMENTS

| | | | |
|---|---|---|---|
| 22272 | of 1892 | United Kingdom | 165/104.21 |
| 767087 | 1/1957 | United Kingdom | 165/104.21 |

*Primary Examiner*—Albert W. Davis, Jr.
*Attorney, Agent, or Firm*—Hubbard, Thurman, Turner & Tucker

[57] ABSTRACT

A unit for recovering thermal energy which utilizes a plurality of unique heat pipes, and the method and apparatus for fabricating the heat pipes is disclosed. The heat pipes are disposed horizontally and are filled with a volume of working fluid sufficient to cause the liquid phase to travel in either direction by gravity. Circumferential capillary grooves in the side walls of the heat pipes transport the liquid phase vertically above the liquid level to increase the area of the liquid-vapor interface. Additionally, the solid metal strips which form the grooves provide a low impedance thermal path from the walls of the heat pipe to the liquid-vapor interface where evaporation and condensation occur. These two factors significantly increase the efficiency of the system. A divider plate having an X-shaped cross section separates the liquid phase from the high velocity vapor phase to prevent slugging under high energy transfer conditions. The divider plate is operative when the unit is disposed in either of two horizontal positions.

The method and apparatus provides a means for fabricating a spiraled capillary groove by cutting the metal from the wall of the tube and raising and folding the cut metal over to provide a groove having a narrow opening for a maximum capillary action. The cutting tool has a curved cutting edge formed by the intersection of a planar surface and a cylindrical surface. Apparatus for driving the cutting tool is also described.

17 Claims, 13 Drawing Figures

HEAT PIPE

This application is a continuation of application Ser. No. 547,955, filed: Feb. 7, 1975, now abandoned, which is a continuation of application Ser. No. 350,799, filed: Apr. 13, 1973, now U.S. Pat. No. 3,865,184 which is a continuation of application Ser. No. 113,571, filed: Feb. 8, 1971, now abandoned.

This invention relates generally to heat transfer devices and more particularly to a heat pipe, and to a method and apparatus for fabricating the heat pipe.

A large number of devices have heretofore been proposed which utilizes a sealed system containing a working fluid having both a liquid phase and a vapor phase at the normal operating temperatures. The liquid phase exposed to higher temperatures vaporizes while the vapor phase exposed to cooler temperatures condenses. Until very recently, devices of this type have either been able to transfer heat only in one direction by using gravity to return the liquid to the warmer end of the system, or have required capillary wicks to transport the liquid in all directions. Since the wicks are difficult and expensive to install properly, this type of device has found only very limited commercial application.

A co-worker in the field has recently discovered that thermal energy can effectively be recovered from the air being exhausted from an enclosure and transferred to fresh air being introduced to the enclosure on a year round basis by utilizing a plurality of bidirectional heat pipes. For example, in the summer, incoming hot air may be cooled by outgoing cool air, and in the winter, incoming cold air may be heated by outgoing warm air. In this system, a large number of relatively long, small diameter heat pipes are provided with fins to provide heat exchange with the two air streams. Initially, capillary wicks were provided to transport the liquid phase longitudinally of the tubes to provide reversibility and was provided around the entire circumference of the tube to increase efficiency. It was subsequently discovered that reversible heat pipe action could be achieved without the expensive capillary wicks by positioning the elongated tubes horizontally and permitting the liquid phase to stand along the entire lengths of the tubes so that the liquid would return from either end to the other by gravity. Although the elimination of the capillary wicks did decrease the efficiency of each heat pipe, this could be partially compensated by increasing the number of heat pipes in a unit. The additional heat pipes was economically competitive with the lesser number of heat pipes having the capillary wicks, but had the disadvantage of decreased efficiency, and increased size and weight.

This invention is concerned with an improved heat pipe particularly suited for use in units of the type described. The improved heat pipe employs circumferentially extending capillary grooves in the wall of the pipe which transport the liquid vertically to increase the area of the liquid-vapor interface and also provide a low impedance thermal path from the walls of the heat pipe through the metal lands to the liquid-vapor interface where evaporation and condensation actually occur.

In accordance with another aspect of the invention, the capillary grooves have a cross section characterized by a restricted opening for development of maximum capillary pumping force with minimum impedance to liquid flow to the point of evaporation and are fabricated by a continuous spiral cutting process in which material from the interior wall of the heat pipe is cut and folded back towards previously cut and folded material. The process utilized a novel tool which is effective, yet very simple and economical to manufacture.

In accordance with still another aspect of the invention, a longitudinally extending horizontally disposed plate is positioned in the heat pipe to minimize interaction between the liquid and vapor phases.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 3:
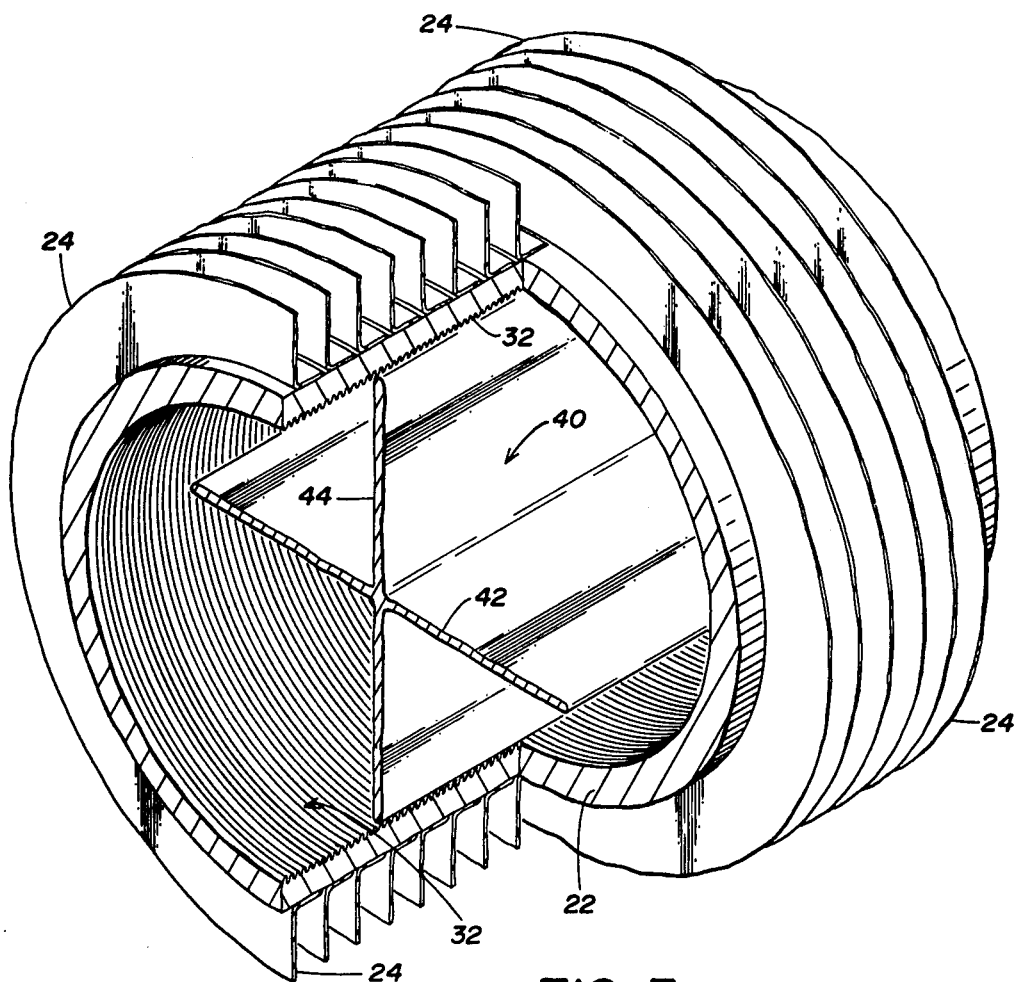
FIG. 3 is an isometric view disclosing details of the construction of the heat pipe illustrated in FIG. 2.
Figure 2:
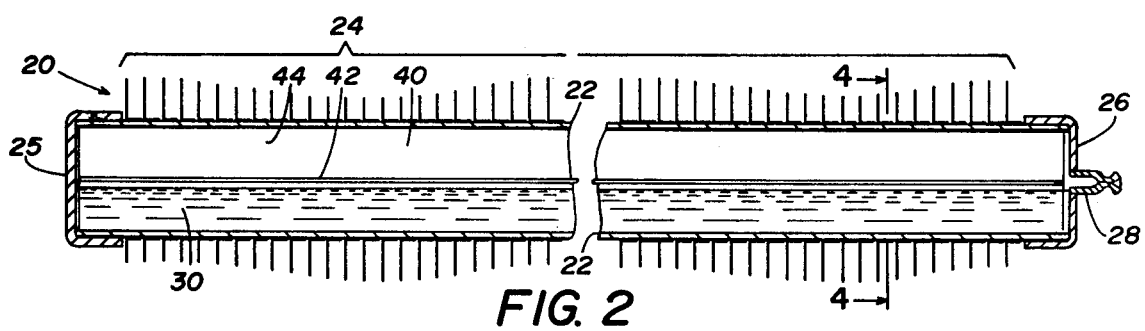
FIG. 2 is a longitudinal sectional view, broken in the center, of a single heat pipe constructed in accordance with the present invention.
Figure 4:
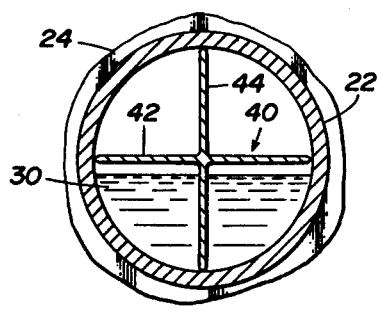
FIG. 4 is a sectional view taken substantially on lines 4—4 of FIG. 2.
Figure 1:
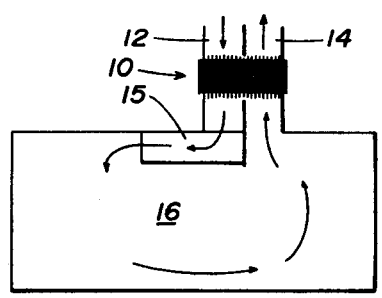
FIG. 1 is a schematic diagram illustrating a unit for recovering thermal energy from exhaust air which utilizes a plurality of heat pipes constructed in accordance with the present invention.

Referring now to the drawings, and particularly to FIG. 1, a unit for recovering thermal energy in accordance with the present invention is indicated generally by the reference numeral 10. The unit 10 has a large number of bidirectional heat pipes 20, each of which is constructed in accordance with the present invention as illustrated in FIG. 2. The heat pipes 20 in the unit 10 are disposed horizontally for purposes which will presently be described and extends through both inlet and outlet air passageways 12 and 14 associated with a building or other enclosure 16 wherein the air is to be either heated or cooled by conditioning unit 15, depending upon the season, to maintain a predetermined temperature within the enclosure. The passageways 12 and 14 may be disposed horizontally, vertically, or any desired angle.

A typical unit 10 might include from sixty to one hundred heat pipes 20, one of which is illustrated in detail in FIG. 2. The heat pipe 20 might typically be from six to eight feet in length and from one-half to three-quarters of an inch in diameter. The heat pipe is typically fabricated of a copper tube 22 because of the excellent thermal conductivity and resistance to corrosion of copper. A plurality of conventional heat-exchanger fins 24 are mounted on the tube 22 in such a manner as to provide good thermal transfer from the fins to the tube. The ends of the tube 22 are sealed by caps 25 and 26. The interior of the tube 22 is first evacuated through a fitting 28 in cap 26, then filled approximately one-third full with a suitable working fluid, such as refrigerant R12, which is represented by the liquid level 30. Then the fitting 28 is permanently sealed such as by crimping and soldering.

Figure 5:
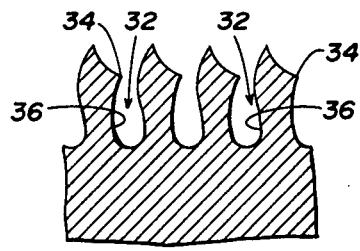
FIG. 5 is an enlarged partial sectional view illustrating a preferred cross-sectional configuration of the capillary grooves of the heat pipe of FIG. 2.

The interior wall of the tube 22 is provided with a large number of closely spaced circumferentially extendig capillary grooves 32, preferably throughout its entire length. When the working fluid is refrigerant R12, the capillary grooves 32 may have a peak to trough depth on the order of 0.014 inches and a spacing on the order of 0.007 inches. As will presently be described, these capillary grooves may be a continuous spiral groove to facilitate manufacture, or may be separate annular grooves. The capillary grooves 32 preferably have a cross section characterized by an opening of reduced width, such as that shown in FIG. 5, where it will be noted that the opening 34 is narrower than the width of the groove at 36, for example. This cross-sectional configuration provides optimum capillary action to transport liquid at the maximum rate. Additionally, the metal strips or lands which form the grooves provide a low thermal impedance path from the heat pipe walls to the liquid-vapor interface where evaporation and condensation occur.

A flow divider 40 extends for a substantial portion of the length of the tube 22. The flow divider has a horizontally disposed plate 42 which extends across substantially the entire diameter of the pipe. The flow divider 40 includes a similar plate 44 disposed at a right angle to plate 42. The resulting X-shaped cross section permits the heat pipe, and thus the unit 10, to be installed in either of two positions, yet still provides a horizontal divider plate. In addition, the X-shaped cross section insures proper positioning of the flow divider and can be economically fabricated by extrusion, and is relatively rigid.

In operation, assume first that the incoming air in passageway 12 is warmer than the outgoing air in passageway 14. In this case, the liquid phase at the ends of the heat pipes 20 disposed within the passageway 12 will be vaporized. Since the surface 30 of the liquid phase is in the lower half of the tube, the vapor is free to travel through the upper half of the tube to the opposite ends of the heat pipes where it is condensed by the cooler air flowing through passageway 14. As the working fluid vapors are condensed, the liquid then returns along the bottom of the tube by gravity because the tube is substantially level. The efficiency of the tube can be reduced as desired for some applications by tilting the heat pipes so that a portion of the evaporator section is starved of liquid.

Although the capillary grooves 32 may be a continuous spiral, no longitudinal transport of the liquid is produced by these grooves. The capillary grooves 32 do, however, transport the liquid phase of the working fluid upwardly above the liquid level 30 to substantially increase the area of the liquid-vapor interface throughout its length. If the incoming air in passageway 12 is colder than the outgoing air in passageway 14, then the right hand end of the heat pipes 20 become the evaporator sections, and the left hand ends become the condensing sections and the flow of the working fluid in the vapor and the liquid phases is reversed. As a result, no switching of the air flow or change in the operation of the device is required as the seasons change.

When high temperature gradients exist between the air in the passageways 12 and 14, such as will exist when the incoming air is below freezing and the outgoing air is between 70° and 80° F., the high volumes of vapor generated will flow at high velocity from the evaporator section to the condenser section. In heat pipes without the flow divider 40, this is likely to cause wave build-up in the liquid returning along the bottom of the tubes. When the waves become high enough to reach the top of the tube, the liquid is moved in slugs thus limiting the vapor velocity to that of the liquid slugs. This reduces the volume of vapor that is transferred to such a low level that any significant thermal transfer ceases.

The horizontal plate 42 of the flow divider 40 partitions the vapor in the upper half of the tube from the liquid in the lower half, thus tending to prevent wave build-up on the upper half with consequent slug flow of the liquid. The vertical plate 44 does not effect this operation, but acts as a stiffener and locator for the horizontal plate 42. In addition, the vertical plate 44 may become the horizontal plate if the unit 10 is rotated 90° upon installation. Thus the unit 10 can be installed to accommodate either horizontally disposed or vertically disposed passageways 12 and 14. Of course, other orientations of the unit 10 can be provided if the plates 42 and 44 are appropriately positioned within the tubes. It will be noted that the edges of the plates 42 and 44 can extend into contact with the walls of the tube 22 without interrupting either the upward or downward flow of the liquid through the capillary grooves 32. This permits the divider 40 to be extruded as a continuous cross section without any openings or notches along its edges to permit the liquid to flow around the edges of the plate, although notches can also be provided if required.

Figure 7:
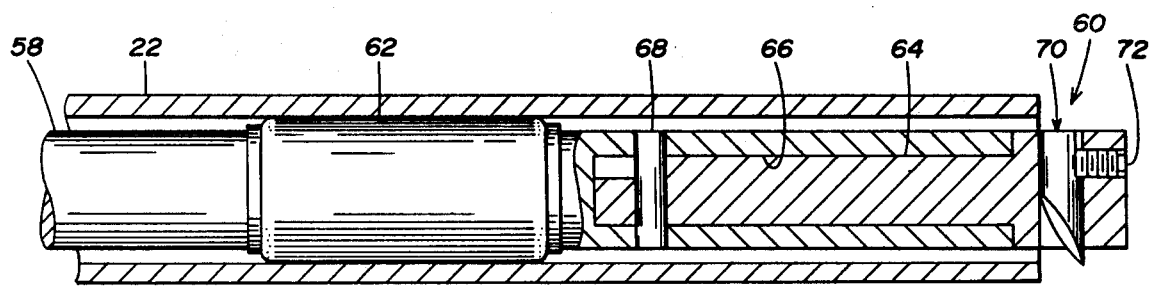
FIG. 7 is an enlarged view of a portion of the apparatus of FIG. 6, partially broken away to reveal details of construction.
Figure 6:
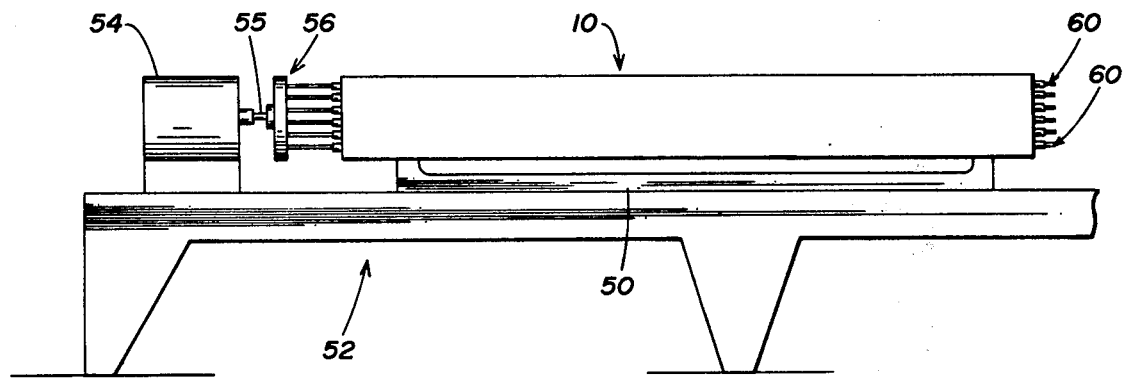
FIG. 6 is a schematic side elevation of apparatus in accordance with the present invention for fabricating the heat pipes of FIG. 2.

The capillary grooves 32 of the heat pipes 20 can be fabricated in accordance with the method and apparatus of the present invention illustrated in FIGS. 6-12. As illustrated in FIG. 6, the unit 10, before the ends of the tubes 22 are sealed, is supported on the table 50 of a conventional lathe 52. The drive shaft 55 of a gear box 56 is placed in the chuck of the lathe. The gear box 56 has six output shafts 58 which extend through six of the tubes 22 of the unit 10. The shafts 58 may be supported by suitable guides (not illustrated). As the shafts 58 are rotated, the table 50 moves the unit 10 away from the drive mechanism 54 at a predetermined rate determined by the desired pitch of the spiral groove 32. As illustrated in FIG. 7, the end of each shaft 58 is journaled in a guide bushing 62 which is closely fitted within the tube 22 to precisely center the shaft. The bushing 62 slides through the tube 22 as the unit 10 is moved away from the drive mechanism 54 and is, therefore, made of a slightly deformable low friction material such as Nylon or Teflon. A tool holder 64 is inserted in a socket 66 in the end of the shaft 58, and is secured in place by a conventional quick connect coupling including the pin 68. A cutting tool 70 is secured within the holder 64 by a set screw 72.

Figures 8, 9:
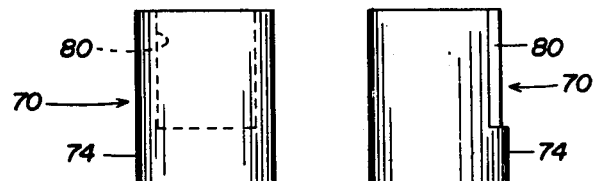
FIG. 8 is a rear view of the cutting tool of the apparatus illustrated in FIG. 7.
FIG. 9 is a side view of the cutting tool illustrated in FIG. 8.
Figure 12:
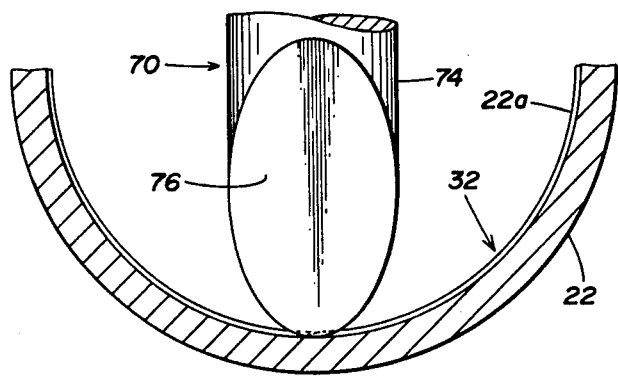
FIG. 12 is a rear view of the structure illustrated in FIG. 10.

The tool 70 which is shown in detail in FIGS. 8 and 9 has an elliptically curved cutting edge 78 formed by the intersection of a planar surface 76 with the cylindrical surface 74 of the body of the tool. The set screw 72 engages a flattened surface 80 on the cylindrical body to position or index the cutting edge 78 at the proper angle so that the tool 70 will cut and shape the capillary grooves as will now be described in connection with FIGS. 10-12.

Figure 10:
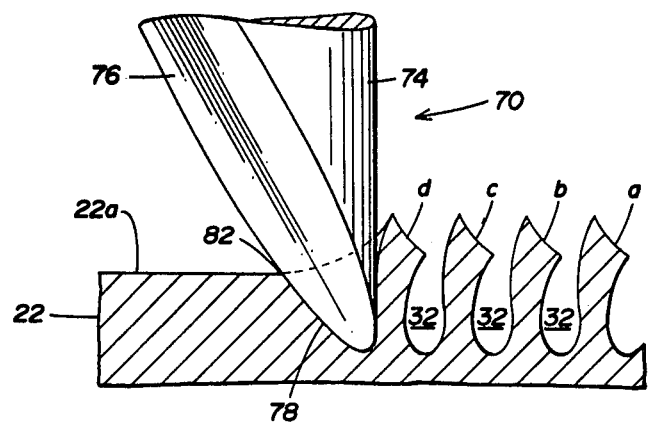
FIG. 10 is an enlarged side view illustrating the method of forming the capillary grooves in accordance with the present invention utilizing the tool illustrated in FIGS. 8 and 9.
Figure 10A:
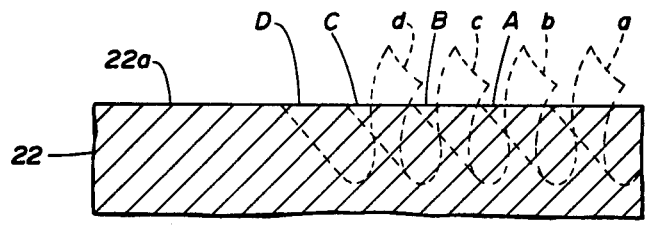
FIG. 10A is a sectional view related to FIG. 10 which shows the transposition of metal to form the capillary grooves in accordance with the method of the present invention.
Figure 11:
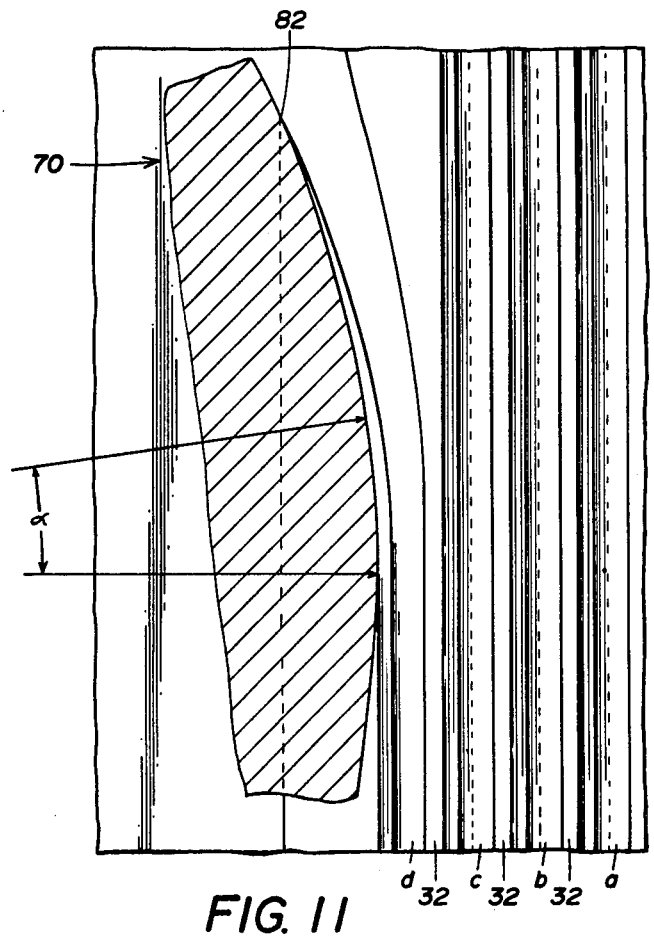
FIG. 11 is a plan view of the structure illustrated in FIG. 10.

In FIG. 10, the surface 22A represents the interior surface of the wall of the tube 22. The cutting tool 70 is illustrated as moving away from the observer, i.e., into the page, relative to the tube wall 22. The tool 70 is positioned such that the major axis of the ellipse formed by the intersection of the flat surface 76 and the cylindrical surface is pitched slightly forward of a right angle to the path of the tool as represented by angle $\alpha$ in FIG. 11. Thus, the flat surface 76 faces slightly rearwardly as illustrated in FIG. 10, so that cutting edge 78 engages the metal of the tube 22. The cutting edge 78 first engages the surface 22a at point 82 (also seen in FIGS. 11 and 12). As the cutting edge 78 proceeds, a strip of metal is plowed away from the main body of metal and transposed into the upright position illustrated in FIG. 10. The transposition of the material is illustrated in FIG. 10A where portions A, B, C and D of the surface 22a are successively moved to positions a, b, c and d, respectively, which are shown in dotted lines. The surfaces a, b, c and d are shown in solid lines in FIGS. 10 and 11.

Examination of FIGS. 10 and 10A reveals that the elliptical cutting edge 78 formed on the tool 70 produces grooves having a cross section with an opening that is significantly narrower than the width of the lower part of the groove for maximum capillary action. It will be noted that no metal is removed by the process. Instead, the metal is cut along a spiral line and folded upwardly to form the grooves. It will be noted that the shape of the bottom of the grooves corresponds approximately to the profile of the elliptical surface 76 when viewed from the rear of the tool as it moves through the metal. The curved profile of the upstanding tongues of metal on either side of the grooves results from the cylindrical surface of the tool body progressively forcing and displacing the metal laterally, thus maintaining the lower part of the groove open as the upper part is closed.

Since no metal is removed from the interior of the tubes, it is unnecessary to follow the cutting tool 70 with a cleaning fluid. Because the cutting operation is carried out within a heat exchange tube, the tube can be cooled by air in heat exchange relationship with the exterior of the tube. Cooling is, of course, enhanced by the fins 24 which are in heat exchange relation to the tube. In accordance with the method of the present invention, it is important to cut the grooves without using a liquid for lubricating or cooling the tube. If an oil or other liquid is used for these purposes, the capillary action of the grooves makes cleaning difficult. The residue of the liquid tends to interfere with further chemical treatment of the interior surface of the tubes and can ultimately effect the operation of the system.

After the grooves are dry-cut, the interior surface on the grooves 32 can be more easily processed by chemicals to oxidize the copper and improve the surface wetting characteristics of the device in a manner known in the metal finishing art.

The size, pitch and cross-sectional geometry of the capillary grooves 32 can be varied to provide the optimum capillary action for different working fluids by varying the size, shape and orientation of the cutting tool. The optimum size and shape of the capillary grooves can be determined mathematically from information relating to surface tension phenomena available in the literature.

Although the invention described herein is particularly suited to sealed heat transfer systems, the various features are also useful in heat exchangers generally. For example, the integral strips a, b, c, d, etc. form integral fins which decreases the thermal impedance in the path from the wall of the tube to the liquid-vapor interface without introducing a metal-to-metal interface which would otherwise form a thermal barrier as in more conventional wick installations. Similar fins can also be formed on the exterior surface of a tube to form capillary grooves. The capillary grooves may be used in any boiler or evaporator system having both liquid phase and vapor phase in the same chamber. The flow divider 42 is also useful in dual phase systems generally.

It should also be noted that a plurality of the cutting tools 70 can be mounted in radially staggered relationship in a single holder 60 to make successive spiral cuts. Thus, if three cutting tools are used, for example, the pitch of the grooves would be tripled and the time required to cut the grooves reduced to one-third that required to cut a single spiral groove.

Although preferred embodiments of the invention have been described in detail, it is to be understood that various changes and substitutions can be made therein without departing from the spirit and scope of the invention as defined by the appended claims.

What is claimed is:

1. The thermal transfer device comprising:
    an elongated, substantially straight, sealed tubular envelope having at least an evaporating section and a condensing section between which thermal energy is to be transferred at an operating temperature;
    a working fluid having a liquid phase and a vapor phase at the operating temperature, the liquid phase standing along the bottom of the envelope only to a level less than the height of the portion of the envelope forming the section and flowing only by gravity from the condenser section to the evaporator section, and
    a plurality of circumferentially extending capillary grooves extending along both the evaporating and condensing sections for transporting the liquid phase circumferentially of the envelope and upwardly from the liquid standing along the bottom of the envelope.

2. The thermal energy transfer device comprising:
    a sealed enveloped comprising a generally horizontally disposed cylindrical tubular member having sealed ends and having walls formed of a generally homogeneous metal and at least an evaporator section and a condenser section between which thermal energy is to be transferred,
    a working fluid having a liquid phase and a vapor phase at the operating temperature of the device, the liquid phase standing in at least one section to a level less than the height of the portion of the envelope forming said one section and flowing by gravity from the condenser section to the evaporator section, a plurality of capillary grooves extending circumferentially around the interior surface of said tubular member in at least said one section for transporting the liquid phase upwardly above the level of the liquid phase in said one section by capillary action; and means for partitioning said tubular member to at least partially separate the longitudinal flow of vapor phase fluid in the upper portion of said tubular member from the liquid phase fluid in the lower portion, said partitioning means including a generally horizontally disposed plate and a generally vertically disposed plate each extending substantial across a diameter of said tubular member and along a substantially portion of the length of said tubular member, at least one of said plate members extending into contact with the sidewalls of said tubular member to support said partitioning means.

3. A thermal energy transfer device comprising:

an elongated sealed tubular member having portions defining an evaporating section and a condensing section between which thermal energy is transferred at an operating temperature;

a quantity of working fluid disposed in said tubular member and having a liquid phase and a vapor phase at the operating temperature of said device;

said tubular member being disposed so that said working fluid may flow in the liquid phase to said evaporating section from said condensing section by gravity, said working fluid standing in the liquid phase along the bottom of at least said evaporating section to a level less than the height of said portion of said tubular member defining said evaporating section;

partition means extending at least partially through said evaporating section and above the level of fluid in the liquid phase in said evaporating section to divide said evaporating section into upper and lower portions, respectively, and at least partially separate the flow of working fluid in vapor phase in said upper portion from working fluid in the liquid phase in said lower portion; and a plurality of grooves formed in an interior wall of said tubular member defining said evaporating section for transporting fluid in the liquid phase upwardly above said level of fluid in the liquid phase in said evaporating section and past said partition means into said upper portion of said evaporating section.

4. The device of claim 3 wherein:

said partition means comprises a generally horizontally disposed plate member extending substantially transversely across said tubular member and longitudinally along a substantial portion of said tubular member.

5. The device of claim 3 wherein:

said partition means comprises a member extending longitudinally of said tubular member and having a generally horizontally disposed plate member and a generally vertically disposed plate member, at least one of said plate members extending into contact with an interior wall of said tubular member to support said partition means.

6. The device of claim 5 wherein:

said tubular member is generally cylindrical; and, said horizontally disposed plate member and said vertically disposed plate member each extend substantially across a diameter of said tubular member and along a substantial portion of the length of said tubular member.

7. The thermal transfer device comprising:

a generally horizontally disposed tubular member having sealed ends and forming a sealed envelope having walls formed of a generally homogeneous metal and at least an evaporator section and a condenser section between which thermal energy is to be transferred;

a working fluid having a liquid phase and a vapor phase at the operating temperature of the device, the liquid phase standing in at least one section to a level less than the height of the portion of the envelope forming the section and flowing by gravity from the condenser section to the evaporator section;

capillary means comprising groove means formed in the walls of the envelope in said at least one section for transporting the liquid phase upwardly above the level of the liquid phase in said at least one section by capillary action; and means for partitioning the tubular member to at least partially separate the longitudinal flow of the vapor phase in an upper portion of the tubular member from the liquid phase in a lower portion, the partitioning means comprising a generally horizontally disposed plate member extending substantially transversely across the tubular member and longitudinal along a substantial portion of the tubular member.

8. The thermal transfer device of claim 7 wherein the partitioning means comprises a member extending longitudinally of the tubular member and having the generally horizontally disposed plate member and a generally vertically disposed plate member, at least one of the plate members extending into contact with the side walls of the tubular member to support the partitioning means.

9. The thermal transfer device of claim 7 wherein:

the groove means comprise a groove formed in a substantially continuous spiral.

10. The thermal transfer device of claim 7 wherein the tubular member is cylindrically shaped in said at least one section.

11. The thermal transfer device of claim 7 wherein:

the liquid phase of the working fluid stands at a common level within both sections intermediate the lower and upper limits of the portions of the envelope forming the respective sections; and there are capillary groove means formed in the walls of the envelope at both sections for transporting the liquid phase upwardly above the level of the liquid phase in the respective sections.

12. The thermal transfer device of claim 7 wherein:

the groove means have openings narrower than other portions of the groove means to provide improved capillary action.

13. The thermal transfer device of claim 7 wherein:

the groove means extend substantially around the interior surface of the envelope in each section.

14. The thermal transfer device of claim 13 wherein:

the tubular member forms an envelope which is cylindrically shaped in each of the sections.

15. The thermal transfer device of claim 13 wherein:

the groove means in each of the sections is a substantially continuous spiral groove.

16. The thermal transfer device of claim 7 wherein:

the capillary means extends substantially the length of the tubular member.

17. The thermal transfer device of claim 16 wherein:

the capillary means comprises a plurality of circumferentially extending capillary grooves.

* * * * *